(12) United States Patent
Held et al.

(10) Patent No.: US 6,885,766 B2
(45) Date of Patent: Apr. 26, 2005

(54) AUTOMATIC COLOR DEFECT CORRECTION

(75) Inventors: Andreas Held, Zürich (CH); Markus Näf, Zürich (CH)

(73) Assignee: Imaging Solutions AG, Wettingen (CH)

( * ) Notice: Subject to any disclaimer, the term of this patent is extended or adjusted under 35 U.S.C. 154(b) by 579 days.

(21) Appl. No.: 10/058,320

(22) Filed: Jan. 30, 2002

(65) Prior Publication Data

US 2002/0126893 A1 Sep. 12, 2002

(30) Foreign Application Priority Data

Jan. 31, 2001 (EP) .............................................. 01102117

(51) Int. Cl.⁷ .............................. G06K 9/00; G06K 9/40
(52) U.S. Cl. ....................................... 382/167; 382/275
(58) Field of Search ................................. 382/115, 117, 382/118, 162, 167, 190, 254, 264, 266, 274–276, 296; 348/370, 576; 358/515, 518; 396/61, 62, 104, 121, 123, 165; 430/357, 359, 362, 364

(56) References Cited

U.S. PATENT DOCUMENTS

| | | | | |
|---|---|---|---|---|
| 5,130,789 A | * | 7/1992 | Dobbs et al. ............... | 358/500 |
| 6,009,209 A | * | 12/1999 | Acker et al. ................ | 382/275 |
| 6,016,354 A | * | 1/2000 | Lin et al. .................... | 382/117 |
| 6,278,491 B1 | * | 8/2001 | Wang et al. ................ | 348/370 |
| 6,285,410 B1 | * | 9/2001 | Marni ........................ | 348/576 |
| 6,577,751 B2 | * | 6/2003 | Yamamoto .................. | 382/117 |
| 6,614,995 B2 | * | 9/2003 | Tseng .......................... | 396/61 |
| 6,690,822 B1 | * | 2/2004 | Chen et al. ................. | 382/162 |
| 6,718,051 B1 | * | 4/2004 | Eschbach .................... | 382/117 |
| 6,728,401 B1 | * | 4/2004 | Hardeberg .................. | 382/167 |
| 6,798,903 B2 | * | 9/2004 | Takaoka ..................... | 382/167 |

\* cited by examiner

*Primary Examiner*—Andrew W. Johns
*Assistant Examiner*—Amir Alavi
(74) *Attorney, Agent, or Firm*—Burns, Doane, Swecker & Mathis, L.L.P.

(57) ABSTRACT

The present invention refers to a method for automatically correcting color defective areas in an image, which defective color areas were recorded with a color spectrum deviating from the actual color spectrum of said areas without color defects, wherein basic areas in the image are identified on the basis of features which are common for these recorded defective areas, said basic areas supporting an increased likelihood to include defective areas, and the processing is then reduced to the basic areas to identify borderlines and/or centres of the defective areas, and afterwards, it is identified whether the localized basic area or areas deemed to be defective are defective or not, and finally, if a localized basic area has been identified to be defective, a correction mask is created to correct the visual appearance of the defective area.

20 Claims, 14 Drawing Sheets

Table 1

|   | Mean | StdDev |
|---|------|--------|
| H | 172  | 16     |
| S | 56   | 22     |
| V | 66   | 17     |

$$\begin{array}{ccc} -1 & 0 & 1 \\ -2 & 0 & 2 \\ -1 & 0 & 1 \end{array} \qquad \begin{array}{ccc} 1 & 2 & 1 \\ 0 & 0 & 0 \\ -1 & -2 & -1 \end{array}$$

FIG. 11

AUTOMATIC COLOR DEFECT CORRECTION

BACKGROUND OF THE INVENTION

1. Field of the Invention

The present invention relates to a method and an image recording device or image printing device for automatically correcting colour defective areas in an image. Such defective colour areas are recorded with a colour spectrum deviating from the actual colour spectrum of said areas without such colour defect. In particular, the present invention relates to an automatic red eye correction.

2. Description of the Related Prior Art

In the field of photography and photo-finishing, the automatic correction of colour defective areas, and in particular of red eye defects, has been a subject for discussion since photographs have been taken, in particular if the subject was photographed by using artificial light, e.g. a flash light. As one example of outstanding importance, the correction of red eye defects will be discussed in this patent application, while also other colour defects can be corrected in accordance with the present disclosure.

It is known that red eye defects are caused by the reflection of flash light from the retina, which causes the pupil to look red or at least reddish. Usually, only the pupil of such a flash light photograph looks red. However, in extreme cases, also the whole eye can become a red patch and even the colour might look pinkish or a kind of orange. It is clear that such kinds of red eye defects or vampire eye defects are not acceptable to a customer and, accordingly, there exists the need to correct such kinds of colour defects.

It is known in the art how to correct such colour defects like red eye defects. However, such correction systems usually require the interaction of an operator, who has to pinpoint the defective location in a picture to a correction system. Furthermore, the operator has to pinpoint the dimensions of the red eye defect to the known systems. Subsequently, the system can help to correct the colour defect or the operator himself decides which colour should be used to generate a correction mask. In any case, this kind of operator interaction is not acceptable in a high speed workflow where several thousands of prints have to be processed per hour.

SUMMARY OF THE INVENTION

Accordingly, it is an object of the present invention to propose a method for automatically correcting colour defective areas in an image, which is reliable and can be applied to high speed printing systems for photographs, regardless of whether these photographs are recorded on exposed films or in an image memory of a digital camera or a digital image recorder.

Furthermore, it is an object of the present invention to propose a corresponding method which can operate completely automatically without the interaction of an operator, which would slow down the overall efficiency of a high speed printing system used in the field of photo-finishing.

The advantage of the present invention are based on a method for automatically correcting colour defective areas in an image, and in particular an automatic red eye correction, which first identifies basic areas in the image to be possibly corrected. Such basic areas should include with an increased likelihood colour defective areas. This identification or detection can be done by any kind of known, or not yet known, detection processing. For instance, the identification or detection can be implemented on the basis of features which are common for the recorded defective areas, e.g. the detection of skin colour to identify skin related areas, a face detection on the basis of a face pictogram or the like, and/or an eye detection and/or similar.

The following references are referred to in order to incorporate the disclosure of these references with respect to the detection of the location of a face and with respect to the detection of a location of eyes. All these kinds of image processing can be used in accordance with the present invention. According to one prior art reference, the Hough transform was used for the detection of eye centers. In "Robust Eye Centre Extraction Using the Hough Transform", by David E. Benn et al, Proc. First International Conference AVBPA; pp. 3–9; Crans-Montana; 1997, the disclosure of which is hereby incorporated by reference in it entirety, a gradient decomposed Hough transform was used which considerably reduces the need for memory space and processing speed of a processing system for image data.

According to another approach, the flow field characteristics, which are generated by the transitions from the dark iris to the rather light sclera, were used to detect eyes in an image. As disclosed in "Detection of Eye Locations in Unconstrained Visual Images", by Ravi Kothari et al, Proc. Int. Conf. on Image Processing, ICIP 96; pp. 519–522; Lausanne; 1996, Lausanne, 1996, the disclosure of which is hereby incorporated by reference in its entirety, it was proposed to use these flow field characteristics. This attempt uses a field similar to an optical flow field generated for a motion analysis. Afterwards, a two-dimensional accumulator is used to achieve votes for intersections of prominent local gradients.

According to Alan L. Yuil et al, it was proposed in "Feature Extraction from Faces Using Deformable Templates", International Journal of Computer Vision, 8:2, pp. 99–111; 1992, the disclosure of which is hereby incorporated by reference in its entirety, to use a deformable template, which provides a model of a human eye. By minimising the costs of such a kind of fit of the template over a number of energy fields, the best fit was iteratively found.

Another kind of automatic eye detection will be referred to below, which was invented by A. Held and has been filed first with the European Patent Office under the title "Automatic Image Pattern Detection". The disclosure of this document is hereby incorporated by reference in its entirety.

According to the method of the present invention, the image data stemming from the identification of the basic areas, in particular human eyes, are processed further to identify borderlines and/or centres of the colour defective areas, in particular defective red eyes. Afterwards, it is detected whether the localised area or areas, deemed to be defective, are defective or not, and in particular whether a detected eye has a red eye defect or not. If a localised area, e.g. an eye, has been identified to be defective, a correction mask is created to correct the visual appearance of the image.

One advantageous alternative to pre-processing is a specialised portrait mode, so that any kind of pre-processing to reduce the area of the input image, which has to be directed to a detection operation and an automatic face detection, can be omitted and replaced by said specialised portrait mode. However, since usually snap shots taken by ordinary consumers do not merely consist of portrait photographs, but of a mixture of a variety of different motives, the method of the present invention would be restricted if it were to be used only in connection with such a specialised portrait mode. However, in case of the use of a specialised portrait mode, the method according to the present invention could also be used. According to the present invention, to save processing time, the processing of an image is stopped if the processing of an image has not resulted in the identification of a basic area to be processed are used for other kinds of image processing and are later exposed on photographic printed paper, recorded on a CD-Rom, transmitted via a data line, the Internet or similar, or are recorded or stored on any kind of image information recording device.

According to another preferred embodiment of the invention, if a center of a basic area, e.g. a human eye, has been identified, an expected defect is emphasised in its intensity (I; Ired) to more easily detect whether the basic area is defective, wherein in the case of a detected defective red eye, the following equation is particularly useful:

$$I_{red} = R - \min(G, B) \quad \text{(Eq. 1.1)},$$

where R refers to a red colour channel, G refers to a green colour channel and B refers to a blue colour channel. The located basic area or areas, in particular human eyes, is/are treated by an edge detection processing to achieve borderlines of the areas. This edge detection is preferably conducted on the basis of the red enhanced image, to obtain easily detectable edges around the borders of the defective parts of the corresponding image or basic areas of the image. Such an edge detection can, for instance, be implemented by a Canny edge detection by means of Sobel operators or other known mathematical processes.

In the case that it is the aim of the present invention to correct a red eye defect, and the position and size of the iris have been estimated, the maximum of the red eye defect is determined to be the actual position of the iris of an eye.

Processing to discover whether a detected human eye actually has a red eye defect, is accomplished by means of the HSV colour spaces. The abbreviations HSV stand for Hue, Saturation and Value colour spaces. Hue represents a value which corresponds to the appearance of a colour. Saturation corresponds to the amount of grey content, i.e. the amount of white or black which is existent in the colour which is to be evaluated in accordance with the HSV colour spaces. For instance, a saturation with the value zero indicates that there is no hue, but only grey scale. The value component of the HSV colour space is a measure of its brightness. The HSV colour space is normalised. Usually, a colour in the HSV colour space can be specified by stating a hue angle, a saturation level and a value level. A hue angle of zero is often defined to represent red. The hue angle increases in a counter clockwise direction and complementary colours are 180° apart. The HSV colour spaces can be device dependent or device independent.

According to this HSV colour space, a large variety of colour defective images, and in particular of images with defective red eyes, have been analysed to be projected into the HSV colour space. On the basis of such analysis, fuzzy membership functions for H, for S and for V were calculated and are used in accordance with the present invention to evaluate whether pixels or so called seed pixels are defective or not. In other words, neighbouring pixels, with respect to the actual position of the iris, are analysed considering said curves or fuzzy membership functions achieved by analysing a variety of real-world photographs with red eye defects, to acquire the fuzzy membership functions for the colour channels to be taken into account. The intersections between the three colour channel positions of each of the neighbouring pixels or seed pixels and the fuzzy membership functions are then determined and, on the basis of the intersections, it is decided whether a particular neighbouring or seed pixel is defective or not. This decision is also based on a predetermined threshold and, if the corresponding value of the pixel does not exceed the predetermined threshold, the red color content corresponds to the usual content of red colour in the image data of a usual human eye, which then does not underlie the red eye defect.

The intersections between the three colour channel positions of a particular neighbouring pixel and the fuzzy membership functions can be accomplished by the Equation:

$$r = \frac{hsv}{\max(h, s, v)} \quad \text{(Eq. 1.2)}$$

The neighbouring pixels or seed pixels are arranged around the detected maximum of the red eye defect, which, as the actual position of the iris of the eye, is determined to represent the center or approximate center of the eye. The neighbouring pixels are arranged around this center and form a layer of neighbouring pixels or seed pixels.

In accordance with a preferred embodiment of the invention, if a layer of neighbouring pixels is at least partially identified as belonging to the red eye defecting pixels, other neighbouring pixels, with respect to the former neighbouring pixels or seed pixels, are analysed along the same line as the former neighbouring pixels to be identified as a red eye defective pixels or not. If further red eye defective pixels have been identified, other additional neighbouring pixels and corresponding layers of neighbouring pixels are analysed, and so on. Accordingly, starting from the center of the iris of an eye or from the center of any other geometrical shape with a colour defect, it is possible to extend an area layer by layer and neighbouring pixel by neighbouring pixel, whereby a correction mask for the colour defective area or red eye defective area is caused to grow.

In accordance with a further embodiment of the invention, the analysis of an extension to neighbouring pixels or seed pixels is terminated if no further other neighbouring pixels have been identified as red-eye defective (or colour defective) and/or if the borderlines of the defective red eye have been reached or exceeded. The borderlines of the colour defective area or defective red eye could have been determined when the image data have been processed to discover the center of an eye and the extension of this eye, i.e. its diameter.

According to a further embodiment of the invention, the pixel data representing the correction mask are directed to at least one smoothing operation. The smoothing operation serves to remove small holes and intrusions as well as small outgrows of the correction mask. In addition, the correction mask data can be directed to binary dilation and also be influenced by a Gaussian smoothing or the like.

The, thus obtained, correction mask is then applied to the matching area of the uncorrected image to remove the red-eye defect or any other colour defect which has to be corrected. At this stage of the method, the correction mask is represented by a grey-scale mask which allows for comparatively efficient gradual corrections towards the borderlines of the colour defective area, and in particular the red-eye defective area. The corresponding correction which can be achieved gives an appearance of the corrected image which is close to the natural appearance of the corrected motive, in particular a human eye.

Since, according to the invention, it is preferred that the correction mask provide normalised grey scale data in a range from m=0 . . . 1, it is possible to use the following Equation to correct the uncorrected input image:

$$R_{new}=R-m(R-\min(G,B.)) \quad \text{(Eq. 1.3)}$$

If, for instance, there is no defect at all for a pixel, then the corresponding value m in the correction mask, i.e. the correction factor m, is 0 as well. Otherwise, according to Equation 1.3, the red colour channel of this particular pixel will be decreased towards the minimum of the green colour channel and the blue colour channel.

According to another embodiment of the invention, if the green colour channel or the blue colour channel of a particular pixel are discovered to be very large, i.e. the difference between the green colour channel and the blue colour channel is really large, the bigger of the two colour channels will have to be adjusted as well to avoid another colour shift which could render the appearance of the defective area unnatural after the correction. This further necessary adjustment can be implemented by Equation 1.3 as well.

An image processing device for processing image data, which can implement the method according to the present invention, includes an image data input section, an image data processing section and an image data recording section for recording processed image data. Such an image processing device, which is in principle known, only requires a memory extension and a modified processing section to run on the basis of the method of the present invention.

According to the invention, an image processing device for processing image data, which can implement the method according to the invention, includes an image data input section, an image data processing section and an image data recording section for recording processed image data. Usually, such kind of image processing devices are image printers including a scanning section for scanning image data recorded on a exposed film. The scanned image data are then stored in a memory and transmitted to a data processing section. In this data processing section, it is possible to implement a method according to the invention and to find out whether particular images include areas with a high probability that searched image patterns are present therein. If such image areas cannot be found, the corresponding images are not further processed, but transferred to an image data recording section, for instance a CRT-printing device, a DMD-printing device or the like. On the other hand, if an area in an original picture can be found, the image data of this original picture are processed in the image data processing section in accordance with the method according to the present invention.

The method of the present invention can also be embodied in a carrier wave to be transmitted through the Internet or similar and, accordingly, it is also possible to distribute the method of the present invention on a data carrier device.

BRIEF DESCRIPTION OF THE DRAWINGS

Other objects and advantages of the present invention will become more apparent from the following detailed description of preferred embodiments, when read in conjunction with the accompanying drawings wherein like elements have been represented by like reference numerals.

FIG. 11 shows Sobel operators to be used in an embodiment of the invention.

DETAILED DESCRIPTION OF THE PREFERRED EMBODIMENTS

While the method according to the invention can also be used to correct colour defects of many other kinds, it will be discussed here with reference to the automatic detection and correction of red eye defects in the field of photo finishing. A red-eye defect occurs if a very strong light, e.g. a flash light is reflected from the retina, i.e. the back of the eye. The red colour is indicative for the blood vessels in the retina. In terms of colorimetry, red-eye defects are not defined properly and there is a very thin borderline between defective and not defective eyes. In general, in red-defective eyes, however, the values for the red colour channel will be considerably higher than the values for the two other colour channels (green, blue).

Figure 1:
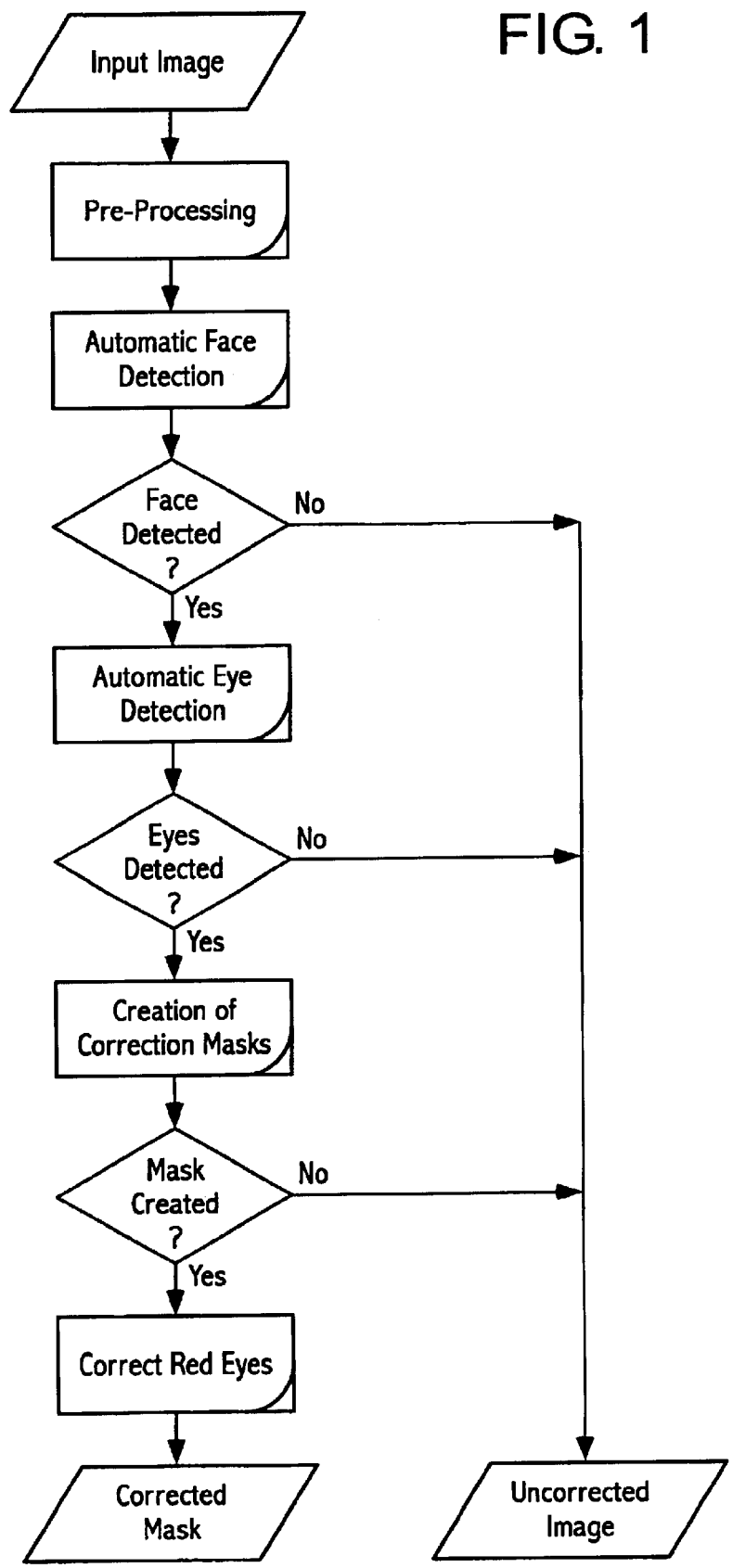
FIG. 1 shows a flow diagram, including one embodiment of the present invention.

As shown in FIG. 1, there are several modules that, in turn, reduce a domain to be searched for. The domain to be searched, for instance, is a basic area in an uncorrected image, in which there is an increased likelihood of finding a particular colour defective area, and in terms of this description, a red eye defect. There can be two detection stages, automatic face detection and automatic eye detection, which are general-purpose modules. This means, these modules do not necessarily use any knowledge about red eyes in particular. Therefore, these modules could extract any face from a photograph and any pairs of eyes or single eyes from a face.

The remaining two modules in FIG. 1, the creation of red eye defect masks and the actual correction of the found defects, use knowledge from the domain of red eye removal, Accordingly, these two modules select and correct only those eyes which actually have red eye defects.

As can be seen from FIG. 1, images that are deemed to either not have a face, whose eyes cannot be found, for whatever reason, or whose eyes do not appear to show any red eye defect, will not be processed.

An extension of this system would be any further processing which relies on the detection of faces for accumulating domain knowledge, e.g., for a specialised portrait mode. Such a system with a specialised portrait mode could be plugged into the system of FIG. 1 simply after the face detector stage.

Figure 2:
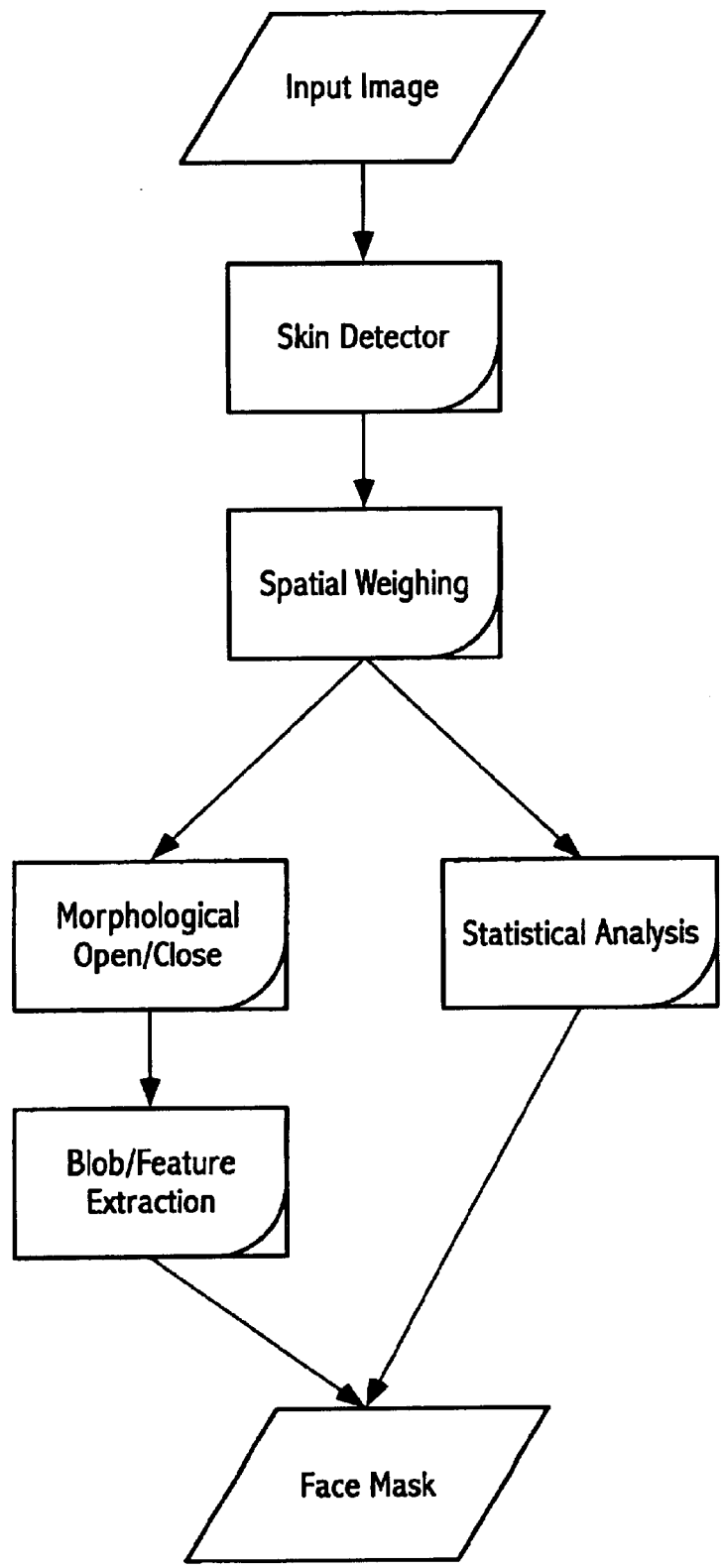
FIG. 2 shows a refined flow diagram for pre-processing.

For certain images, it would be desirable to determine at an early stage whether or not there is any chance of finding a face in the image. If the performance of the face detector itself is already a problem, then it would be of advantage to apply the face detector only to those images where there is a considerable likelihood of finding a face. If the likelihood is too small, the image processing can be terminated before calling the face detector. Such a simple, but fast, pre-processing or pre-screening test could be implemented according to FIG. 2. The main parts of this module are a skin detector that marks all the areas in the image that could contain skin information. This skin map can then further be analysed statistically or spatially to obtain either a simple yes/no answer as to whether there are any faces or a probability map can be calculated and be fed to the face detector to further restrict its search space.

For the actual detection of faces, any system that fulfils this reasonably well will do. This could be for instance a neural network approach, as proposed by Henry Rowley, "Neural Network-Based Face Detection", PhD Thesis CMU-CS-99-117, Carnegie Mellon University, Pittsburgh 1999, or some wavelet based approach, as proposed by Schneiderman et al., "A Statistical Method for 3D Object Detection Applied to Faces and Cars", Proc. CVPR 2000, Vol. I, pp. 746–752, Hilton Head Island 2000. Of importance at this stage is that the detection of faces happens fully automatic and that the detection rate is reasonably high and the false negative rate, that is, faces being detected even though there is no face present, is reasonably low. What reasonable constitutes will depend on the actual context of the application. The disclosure of the Rowley and the Schneiderman references are hereby incorporated by reference in their entireties.

Figure 3:
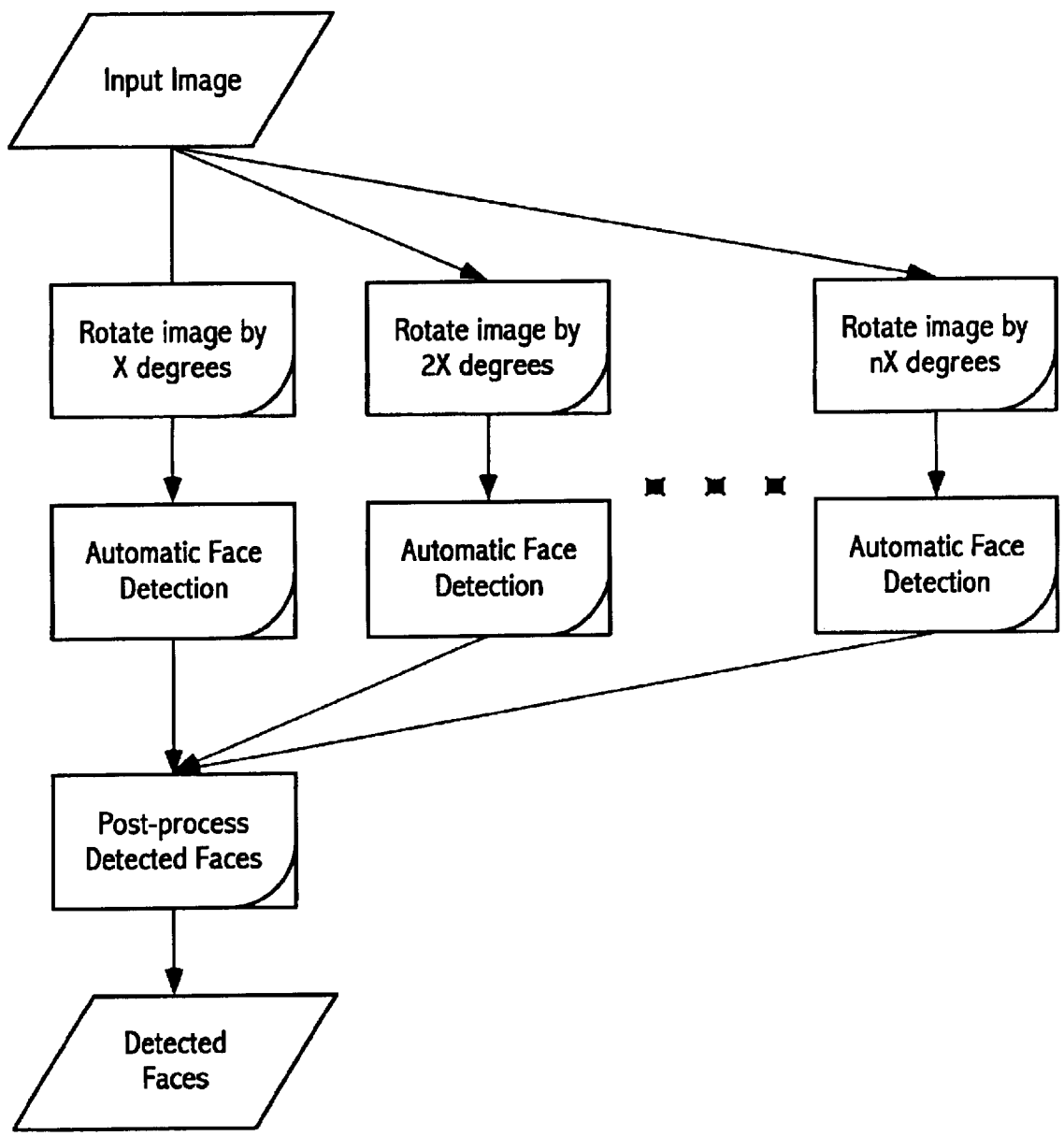
FIG. 3 shows a face detection in a refined version with respect to FIG. 1.

As most face detectors are not invariant to rotation, it can be useful to ensure that all the possible orientations of faces can be detected. How to do this will highly depend on the face detector being used, as the rotation invariance of each detector will vary widely. For instance, in Rowley's approach, rotation invariance is given within approximately ±15°. On the other hand, in the approach by Schneiderman, rotation invariance is given in a range of about ±45°. Therefore, rotation invariance has to be ensured by external means, this can for instance be done by pre-rotation of the image, followed by a post-processing and the normal face detection. This is shown in FIG. 3.

For a system based on the face detector by Schneiderman, four stages are necessary. In other words, the face detector is applied to images rotated by 0°, 90°, 180° and 270°, respectively.

Once a face has been detected, the search space for finding eyes can be restricted considerably. According to the above-described method, it is possible to obtain a bounding box of a face, together with its approximate orientation. As stated before, face detectors are, in general, not rotation invariant. Therefore, orientation of the face could be obtained in the range given by the rotational invariance of the face detector, which could be up to ±45° in the case of the Schneiderman detector.

There is a variety of approaches that can be applied for detecting eyes. Again, similar to the detection of faces, it is important to have an approach that works fully automatic, has a high recognition rate, and a low false positive rate.

Figure 4:
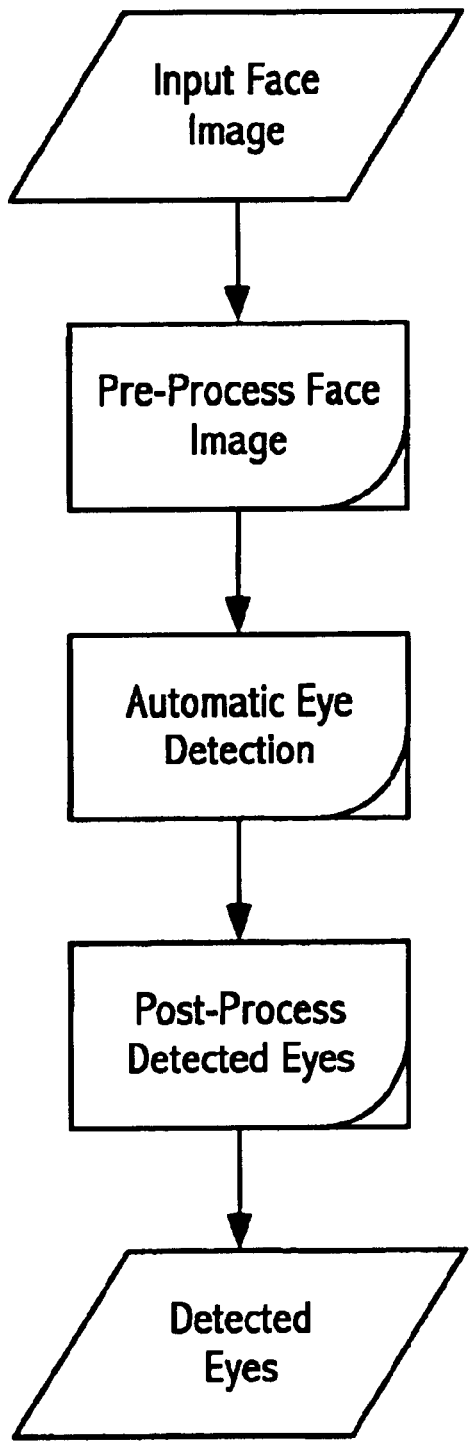
FIG. 4 shows a rough flow diagram of a part of an embodiment of an image data processing, which can be used in connection with the method of the invention.

The basic approach for automatic eye detection is outlined in FIG. 4. As pre-processing step, any processing can be incorporated that will enhance facial features, as for instance, histogram normalisation, local contrast enhancement, or even red-enhancement according to Equation (1.1) for red-eye detection. In general, it is a good idea to normalise the input image, both in size and in lightness at this stage. The actual eye detection stage can be performed according to one of the many approaches that can be found in the literature. For instance, Benn et al propose a very interesting approach for the detection of eye centers based on a gradient decomposed Hough transform. Although Hough transforms might not appear the best choice due to rather large requirements on memory and processing speed, they show that this need can be greatly reduced by using the so-called gradient-decomposed Hough transform. A slightly different approach is taken by Kothari et al, "Detection of Eye Locations in Unconstrained Visual Images, Proc. Int. Conf. on Image Processing,; ICIP96; pp. 519–522; Lausanne; 1996, the disclosure of which is hereby incorporated by reference in its entirety, who analyse the flow field characteristics generated by the dark iris in respect to the light sclera. Another approach was proposed by Yuille et al, "Feature Extraction for Faces using Deformable Templates", International Journal of Computer Vision, 8:2, pp. 99–111, 1992, the disclosure of which is hereby incorporated by reference in its entirety. They suggested to use deformable templates for eye models which are then drawn to the exact location by optimising the fit over some combination of energy fields. This is a very interesting approach that will give a lot of information about the detected eyes, however, there is a danger of the optimisation procedure being caught in local minima.

In general, it is of interest to select an approach for eye detection that does not rely on dealing with unoccluded frontviews of faces. This means, to avoid a breakdown of the approach in the case that only one eye is visible, for instance, in the case of a profile or due to occlusion, it is better to implement an approach to eye detection that gives a number of viable eye candidates.

Finally, during post-processing, one can try to eliminate eye-candidates that are not plausible. This can, for instance, be done by taking into account some confidence measure as can be obtained from some eye detectors.

Figure 5:
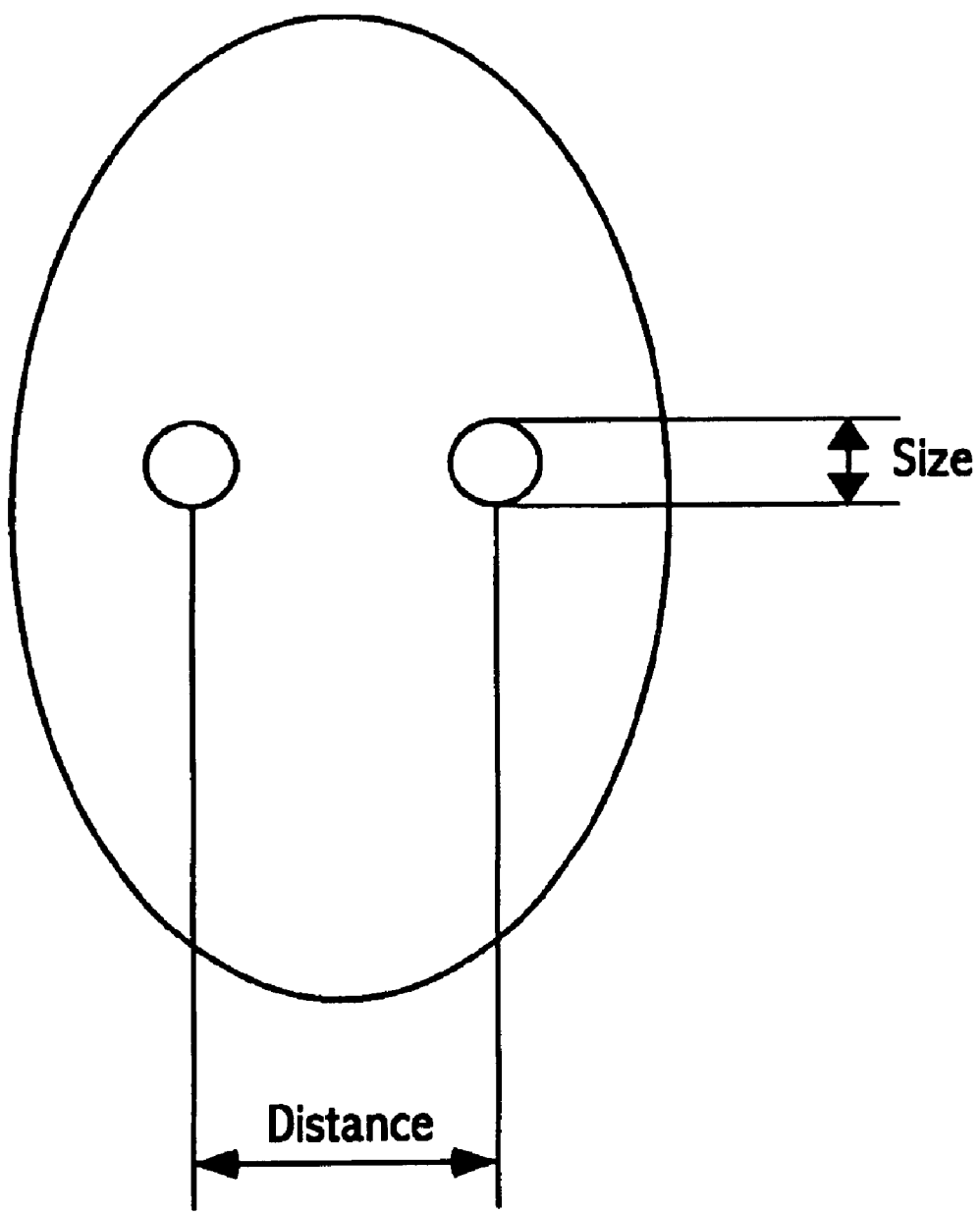
FIG. 5 shows a rough pictogram of a human face having merely eyes.

By sorting the eye candidates according to their confidence and by further analysing pairs of eye candidates according to distance and orientation in respect to the face, it can be possible to disregard those candidates that would yield highly unlikely constellations. In the end, at most, two eye candidates per face will be kept. If there are two candidates, then they will fit a very coarse model of a face, as shown in FIG. 5.

Another kind of detection of an eye location will now be discussed with reference to FIGS. 10 to 17.

Figure 10:
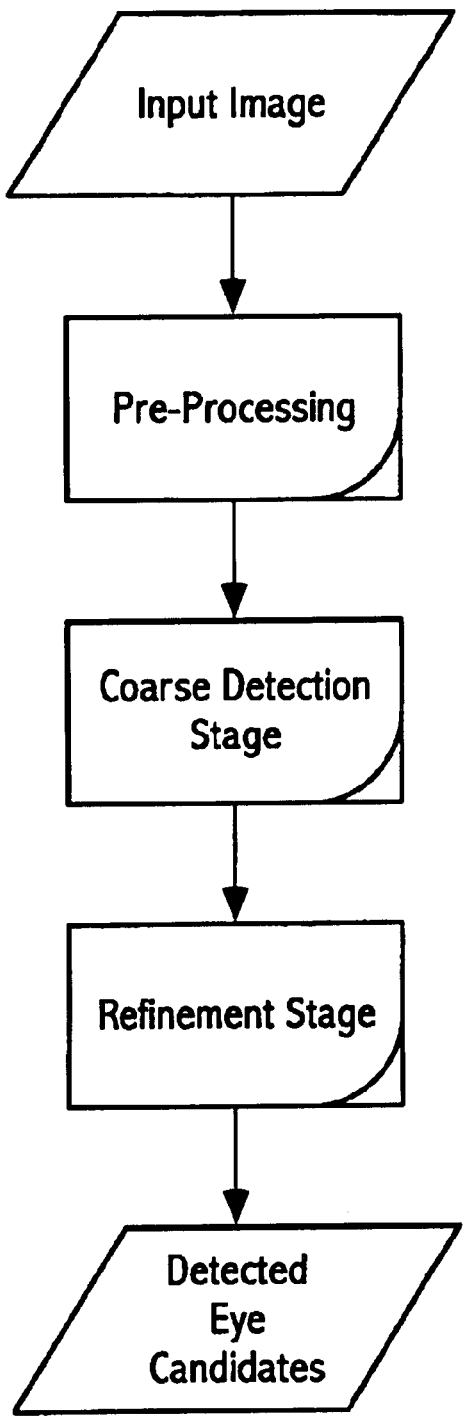
FIG. 10 is a flow diagram showing the principles of the method according to the present invention.

FIG. 10 shows a flow diagram for the automatic detection of image patterns and particularly for human eyes, the sun, a flashlight reflection or the like. The detection is carried out in two stages: a coarse stage followed by a refinement stage. During the coarse stage, the exact locations of the searched image pattern are of less interest. However, attention is rather directed to areas that are of interest and that are likely to contain the searched image patterns, e.g. eyes. During the refinement stage those regions will then be further examined and it will then be determined whether there actually is a searched image pattern, e.g. an eye and, if yes, what is its location and approximate size.

In the following, the disclosure is directed to the recognition of the location of eyes, while it is, of course, possible to proceed with other image patterns approximately the same way.

For both the coarse and the refinement detection stage, the gradient decomposed Hough transform is relied on for the detection of eyes.

The classical theory of the Hough transform will be referred to below. This transform is the classical method for finding lines in raster images. Consider the equation of a line in Equation (2.1).

$$y=mx+c \qquad (2.1)$$

If, for each set pixel in the image, x and y are kept fixed and a line is drawn in the accumulator space according to Equation (2.2), then for each line that is formed in the original image, all the lines drawn in the accumulator will intersect in one place, namely the place that determines the proper parameters for that line in question.

$$c=xm+y \qquad (2.2)$$

The original theory of the Hough transform can be extended to accommodate other curves as well. For instance, for circles, it is possible to use the parameter model for a circle as given in Equation (2.3). Now, however, this will require a three-dimensional parameter space.

$$r^2=(x-a)^2+(y-b)^2 \qquad (2.3)$$

An extension to this approach is to use gradient information rather than the actual raster image. Differentiating Equation (2.3) with respect to x yields Equation (2.4), $$\frac{dy}{dx} = \frac{x-a}{y-b} \qquad (2.4)$$

Where dx and dy are the vertical and horizontal components of the gradient intensity at the point (x,y). By substitution, it is obtained $$x_0 = x \pm \frac{r}{\sqrt{1+\frac{dx^2}{dy^2}}} \qquad (1.1)$$

$$y_0 = y \pm \frac{r}{\sqrt{1+\frac{dy^2}{dx^2}}} \qquad (1.2)$$

Now, the center of the circle of interest can be obtained by finding a peak in the two-dimensional accumulator space. What is interesting in the representation derived here is that all circles that are concentric will increment the accumulator in the same location. In other words, for detecting eyes where there are a lot of circular arcs from the iris, the pupil, the eye-brows, etc, the y will all add up in the same accumulator location and allow for a very stable location of the eye center. However, since the variable r was removed from the parameter space, it will not be possible to detect the radius of the eye in question.

First, it is reasonable to start the approach for the detection of eyes with some kind of pre-processing. Here, for instance, it is useful to normalise the input image to a known size, given by a model face image, or any kind of histogram normalisation or local contrast enhancement can be performed. For this approach described here, it s preferred to restrict the domain of the input by only looking at a part of the image. Assuming that the input image is a proper fact image, preferably the output from some face detection scheme, it is decided to look only at the upper ⅔ of the image as shown in FIG. 4. This will allow to neglect parts of the mouth and even the nose, that contain a lot of curved features and could mislead further detection of the eyes.

Depending on the domain of the system, which is further processed, it is useful to apply some special colour space conversions in order to stress certain features. For instance, if eyes for later red-eye removal are to be detected, it is useful to employ a red-enhanced colour space as input to the gradient calculations, as is shown in Equation (3.1).

$$I_{red}=R-\min(G,B) \qquad (3.1)$$

Given the pre-processed input image, it is possible to proceed to calculate the gradient information, which will then be needed for the actual Hough transform. The gradient images can either be calculated by applying Sobel templates or operators as shown in FIG. 11, or by utilising other gradient information, as for instance can be obtained from the Canny edge detector.

Figure 13:
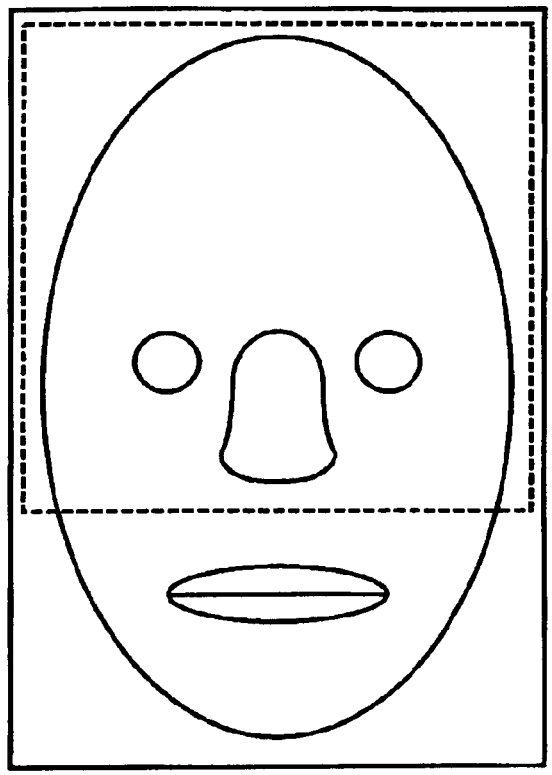
FIG. 13 shows a pictogram of a face.

At this stage, it is decided to apply a straight-line removal procedure to the gradient images. This will allow the influence of very strong, but straight, gradients on the accumulator to be reduced considerably. The outline of straight-line removal is shown in FIG. 13. Straight-line removal attempts to isolate straight lines from the detected edges and removes those areas from the gradient image. In general, this will result in a much better detection of the eye center.

Figure 12:
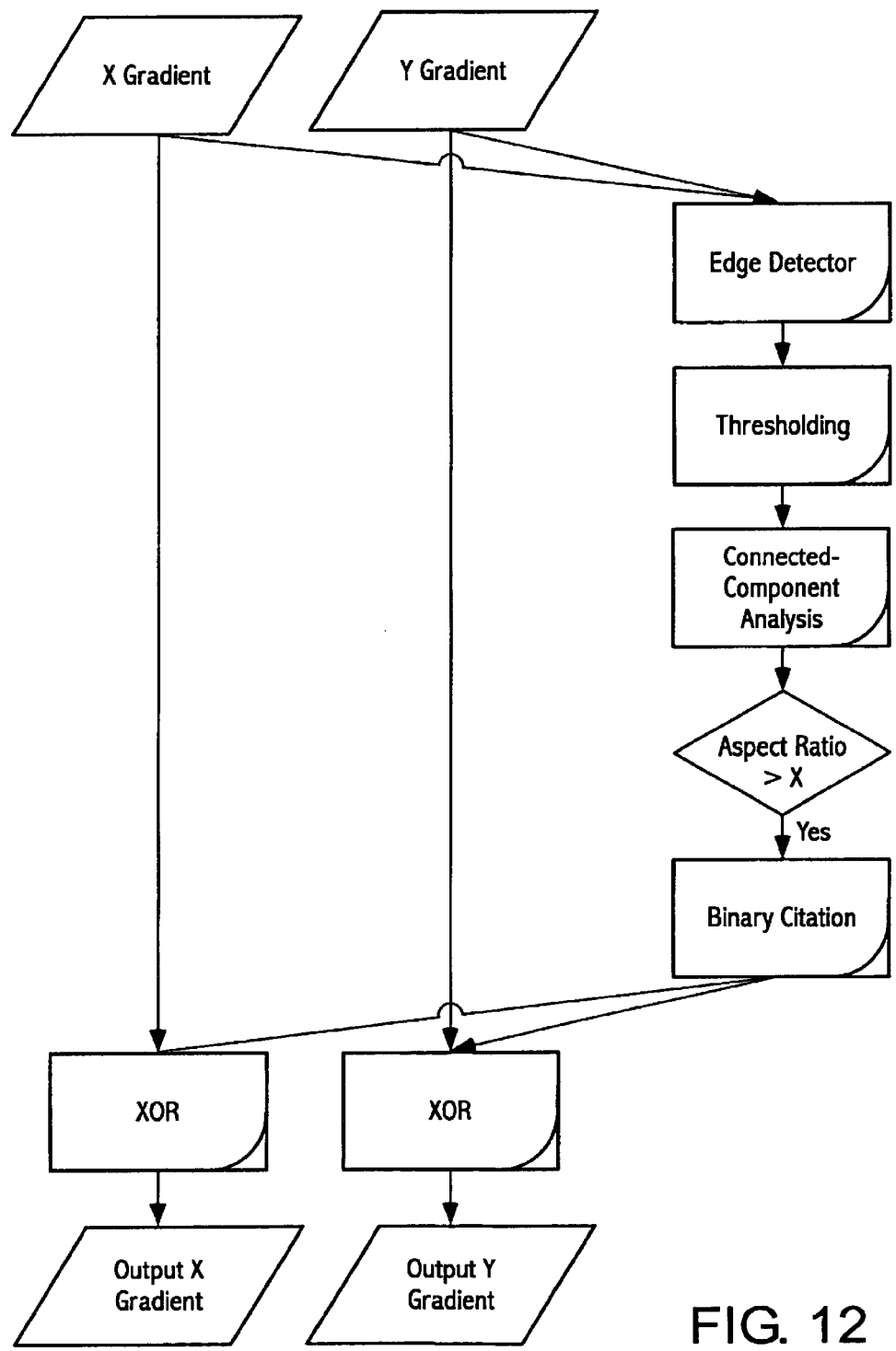
FIG. 12 is a flow diagram depicting a first stage of the method in accordance with one embodiment of the invention.

Straight-line removal as shown in FIG. 12, includes the following steps. First, the edges of the image are extracted by applying some edge detector, for instance, the Canny edge detector. Applying some threshold to the detected edges provides for a binary that contains only the most prominent edges. Now, a connected component analysis is applied to the binary image. For each connected component, its aspect ratio is calculated by extracting the major and the minor axis. If the aspect ratio is bigger than a previously set value, it is assumed that the component is, in fact, a straight line. If not, then the component is selected from the edge image. Repeating this for all connected components leaves only the straight lines in the image. By dilating them, e.g. with a 3×3 structuring element, for instance a matrix the area of influence is slightly increased and then those areas are removed from the original gradient images by applying, e.g. an XOR operation.

Figure 14:
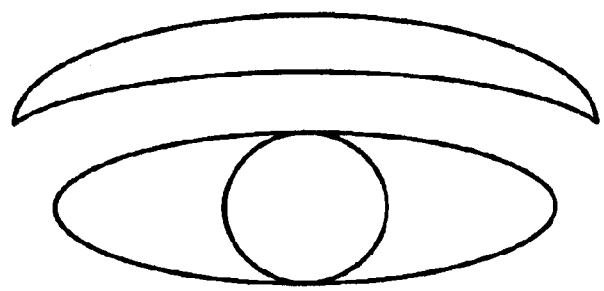
FIG. 14 shows a pictogram of a human eye.
Figure 15:
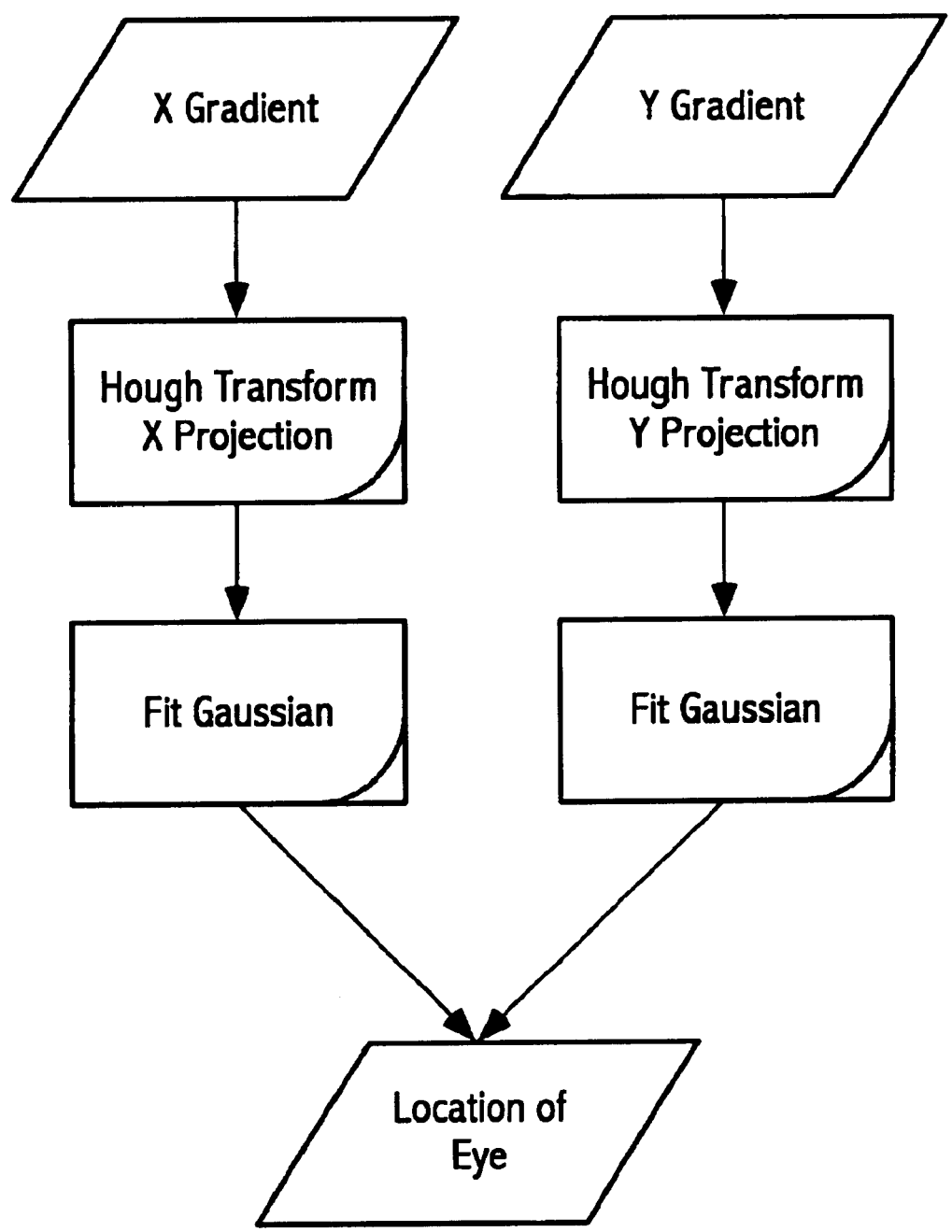
FIG. 15 shows one embodiment of a second stage of an embodiment of the method of the present invention.

By referring to FIG. 14, it can be taken into account that all the gradient information from the iris, the pupil, and even the eye brow will point towards the very center of the eye.

This means, by first calculating the gradient information from an image and by adding up the accumulator for a certain range of this will provide a two dimensional accumulator space, which will show prominent peaks wherever there is an eye. It is interesting to note here that the correspondence between the accumulator and the original image is one-to-one. This means, where there is a peak in the accumulator there will be an eye center at exactly the same location in the original image.

Figure 16:
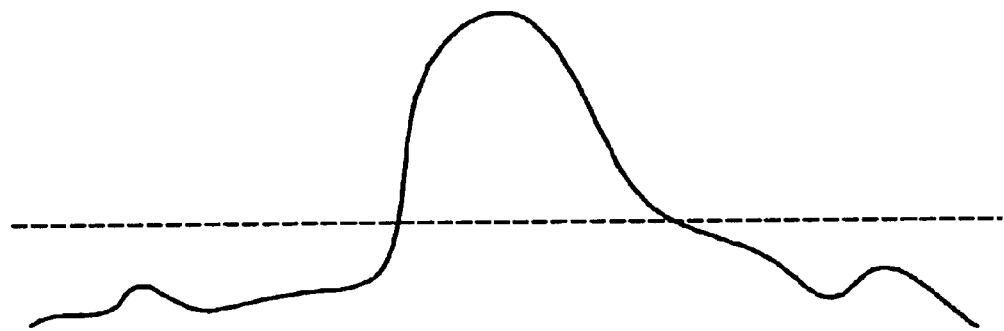
FIG. 16 shows the distribution as a result of one embodiment of the first stage of the invention.

Looking at a cross section of the accumulator in FIG. 16, it can be seen that there will be a lot of local maxima for rather low values. To avoid finding all of these local maxima the lower range of the accumulator can be completely neglected. This is done according to Equation (3.2) and results in the accumulator space as shown in the lower part of FIG. 17.

$$A' = \max(0, A - \max(A)/3) \quad (3.2)$$

Finally, it is possible to apply a simple function for isolating local peaks to the accumulator. Care has to be taken though as some of the peaks might consist of plateaus, rather than of isolated pixels. In this case, the center of gravity of the plateau will be chosen. At this point a list of single pixels which all can represent eyes is achieved. As the size of the face image has been fixed in the very beginning, a simple estimate for the eye size is now employed to isolate eye surroundings or eye boxes centered at the detected pixel.

The input to the second stage, i.e. the refinement stage, are the isolated boxes or surroundings from the previous stage, each containing a possible eye candidate, together with the gradient images as described before. An outline of the refinement stage is given in FIG. 15.

Figure 17:
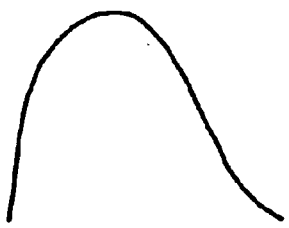
FIG. 17 shows the distribution according to FIG. 16 after further processing.

Basically, the approach is the same as for the coarse detection stage. However, instead of having one two-dimensional accumulator, now two one-dimensional accumulators are used. This means, each accumulator will contain the projection of all the votes onto the axis in question. Differently to the coarse detection stage, where a projection would incur many spurious peaks due to spatial ambiguities, in the case of the eye boxes, it can safely be assumed that there is not more than one object of interest within the surrounding or box. Therefore, using projections will considerably simplify the task of actually fitting a model to the accumulator, as it has only to deal with one-dimensional functions. Again, the projections would look somewhat similar to the cross-section as shown in FIGS. 16 and 17, and they can be treated accordingly, following Equation (3.2). For the remaining values in the accumulator, a Gaussian distribution can be used and its mean and standard deviation can be calculated. The two means, one from the x projection and one from the y projection, directly give the location of the eye center. The minimum of the two standard deviations will be taken as an estimate for the size of the eye.

For the projection onto the x-axis, the estimate of location and size will be rather accurate in general, due to the symmetry. For the projection onto the y-axis, however, there might be some kind of bias if there is a strong eyebrow present. In practice, however, the influence of this can be neglected, as it usually will be offset by other gradient edges below the eye.

For each detected eye candidate, it is possible to further extract some kind of confidence measure by looking at how many votes this position received in the two-dimensional accumulator space. A high number of votes strongly corroborates the actual presence of an eye.

According to the invention, an automatic approach to image pattern detection based on the hierarchical application of a gradient decomposed Hough transform has been presented. Due to the splitting up of the task into a coarse and a fine stage, it is possible to get a much more robust image pattern, and thus also a much more robust eye detector with a high detection rate and a low false positive rate.

Figure 6:
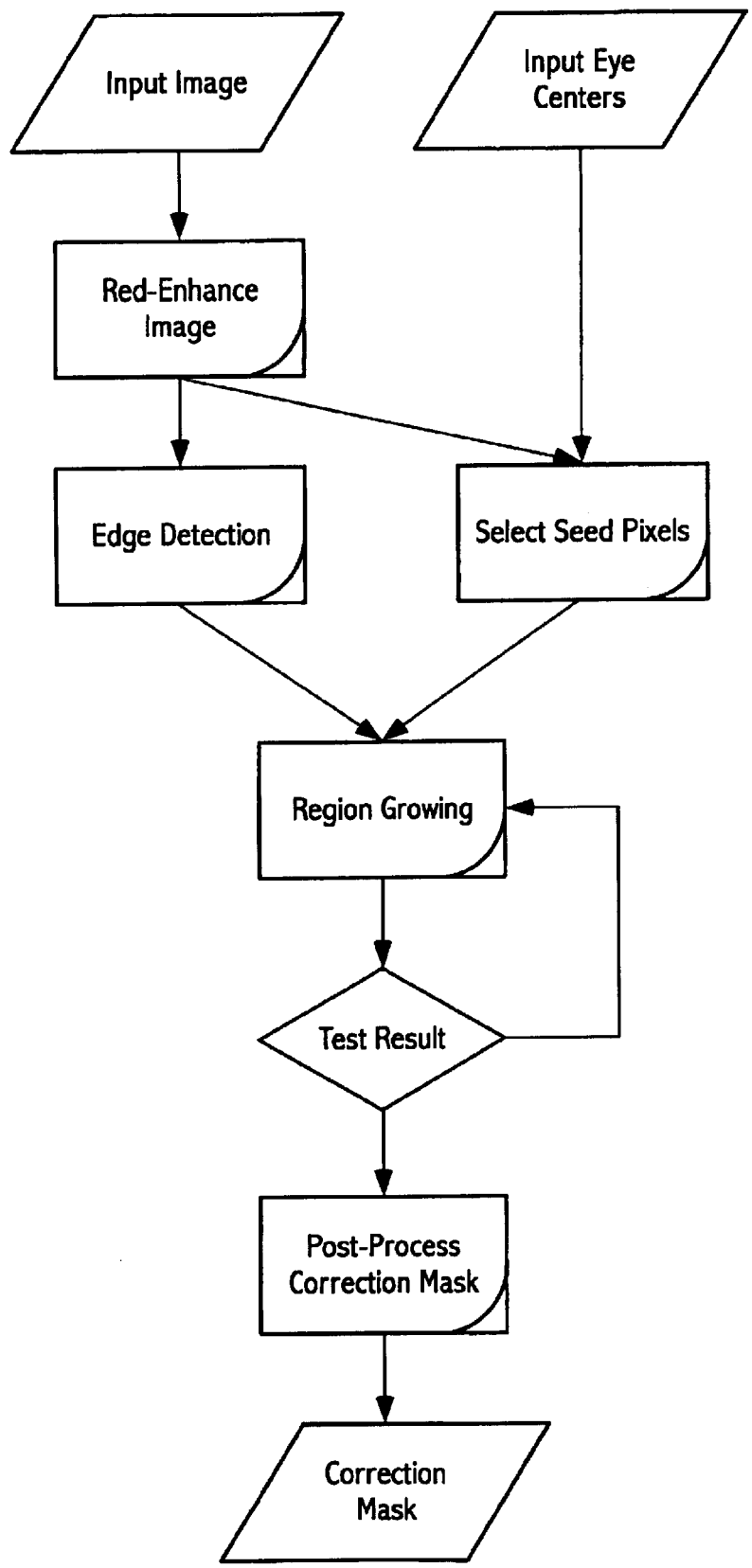
FIG. 6 depicts one advantageous embodiment in accordance with the invention.

Once the centers of the eyes have been found it has to be decided whether this eye has a red eye defect, and, if yes, what portions of the of the eye are defective. This task is commonly referred to as the creation of the correction mask, as the correction mask specifically pinpoints those pixels that have to be corrected for. A basic overview of the creation of the eye correction mask is given in FIG. 6.

In order to reliably find eyes with red colour defects, the image is first converted into a red-enhanced space, which consists of only one colour plane. The definition of the red-enhanced space is as given in Equation (1.1):

$$I_{red} = R - \min(G, B) \quad (Eq. 1.1)$$

where R refers to the red colour channel, G to the green colour channel, and B to the blue colour channel of the input image, respectively. This definition will result in red-eye defects being amplified and thus easily detectable.

Afterwards, it is sensible to direct the resulting image data to an edge detection processing. The edge detection is used as border condition for a later region growing procedure. Any edge detector with a reasonable performance will do, for instance, the Canny edge detector. The aim of edge detection on the red enhanced image is to obtain strong edges around the borders of the red-defective parts. This border edges can then be used for restricting the region growing procedure, to avoid bleeding of the grown region, for instance, into adjacent skin regions. If course, if such edge information has been obtained already during localisation of the eyes or the iris, this data can be used as well.

Figure 7:
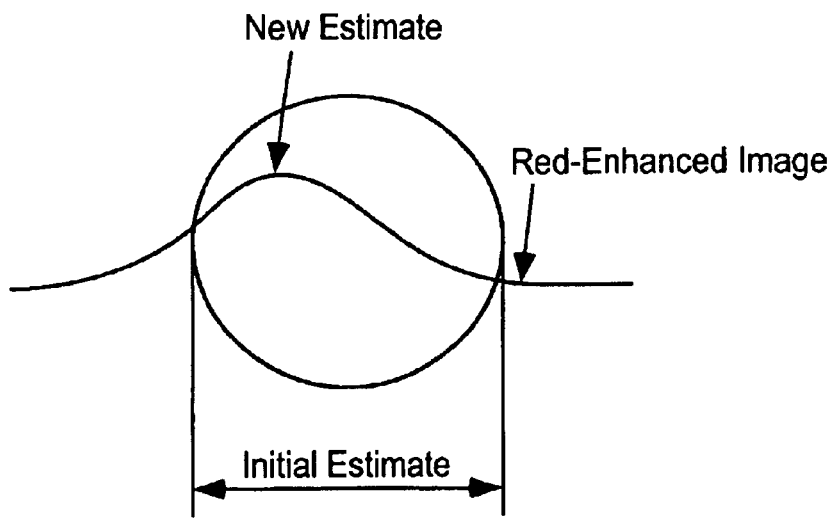
FIG. 7 illustrates the initial estimate for a red eye defective area and the position of a new estimate calculated to be within the borders of the initial estimate.

According to the initial estimate for the position and the size of the iris, as obtained from the eye detector, it can be decided whether there is a red defect in this eye and where exactly the iris with the strongest defect is located. This is shown in FIG. 7.

After the strongest defect (New Estimate) has been detected, this strongest defect is used as the center for the further extension to neighbouring pixels directly located around the center or center pixel. The neighbouring pixels or seed pixels are then deemed to represent a layer of neighbouring or seed pixels.

Figure 8:
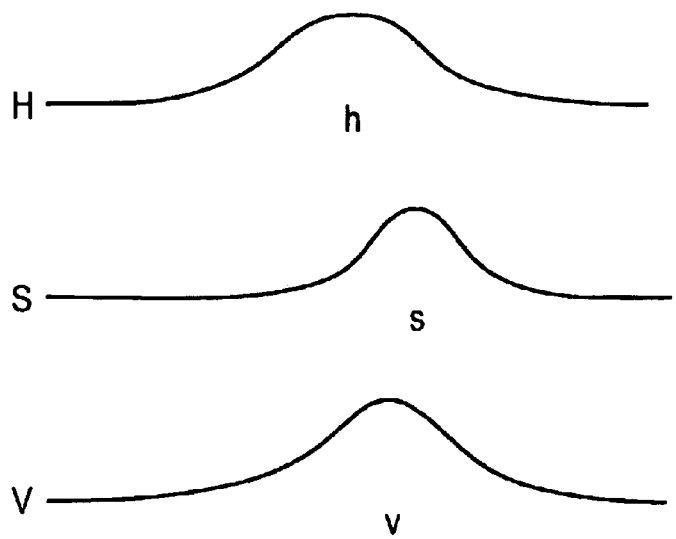
FIG. 8 shows fuzzy membership functions calculated with respect to the HSV colour space.

Whether a seed pixel really belongs to a red-eye defect is determined according to its HSV value and a fuzzy membership function as shown in FIG. 8. Actual values for the parameters are given in Table 1. If the fuzzy intersection r of the three channels has been calculated, see Equation (1.2), then it can be decided with a simple thresholding operation whether the seed pixel belongs to the class of red-eye defects or not $$r = \frac{hsv}{\max(h, s, v,)} \quad (Eq. 1.2)$$

Based on the so selected seed pixels, one starts to recursively add layers of further neighbouring or seed pixels around the respective last layer. First, all the background pixels that border the seed region are marked. For each such pixel, a test is done as to whether its HSV values permit it to be added to the seed region. For this test, the same set of fuzzy membership functions as before can be used, as shown in FIG. 8.

The model from FIG. 8 was obtained by analysing a number of red-eye defects from various real-world photographs. Again, by taking the fuzzy intersection of the HSV values, it can be decided by thresholding whether or not to add the pixel in question to the seed region, which, after its completion will provide the correct mask. In addition, if the pixel in question is an edge pixel as indicated by the edge image, this pixel is omitted. After adding one layer to the seed region, it is tested whether its major geometric properties are still within the specified limits. Basically, the created seed region should not exceed a certain size and its eccentricity should be closed to a circle. The latter can be tested by taking the ratio between the major and minor axes of the seed region. If, during this iteration, some neighbouring pixels were added and the region passed the geometry test then we proceed to adding a new layer. Otherwise, the region growing stops.

Figure 9A:
FIG. 9a shows a correction mask before a smoothing operation.
Figure 9B:
FIG. 9b shows the correction mask according to FIG. 9a after a smoothing operation.

Several steps can be performed at this stage in order to clean the resulting correction mask (see FIG. 9a) and to adapt it for further correction of the original image. In order to remove small holes and intrusions, a binary closing with a 7×7 approximation to the disk structuring-element can be applied. Further, to remove small outgrows, a binary opening with a 3×3 structuring-element can be used. Finally, a binary dilation with a 5×5 structuring element and a Gaussian smoothing with a 7×7 Kernel can be used. The effect of this operation is shown in FIG. 9b.

Smoothing the eye-defect correction mask allows for a very effective correction in the next stage. On the basis of the above processing steps, a grey-scale mask has been obtained and it is relatively easy to allow for gradual corrections towards the borders of the red-eye defects. This, in general, looks far more natural than any sudden change.

At this stage, the uncorrected input image and a correction mask, as outline above, have been obtained. The correction mask is not a binary mask, but rather a grey-level mask, which is, at the same time, a measure for the probability whether a certain pixel belongs to a red-defect region or not. Pixels along the borderlines receive a gradually decreasing probability, allowing for a smooth change between corrected and uncorrected regions.

If it is assumed that the mask represents actual probability values for eye defects in the range m=(0 ... 1), then it is possible to express the correction for the defects as shown in Equation (1.3).

$$R_{new}=R-m(R-\min(G,B)) \qquad \text{(Eq. 1.3)}$$

In words, if the probability of an eye defect is 0, then the correction factor is 0 as well. Otherwise, the red channel will be pulled towards the minimum of both, the green and blue colour channels, in effect leading to a rather darkish iris of an undefined colour. In the case where the difference between the green and blue channel is rather large, the bigger of the two colour channels will have to be adjusted as well, avoid a rather unpleasant colour shift, This adjustment can be done similarly to Equation (1.3).

According to the present disclosure, a hierarchical approach has been used that consecutively reduces the search space by taking into account semantical information about the image in question. In addition, the hierarchical approach allows one already at an early stage to abandon the processing of images which do not contain the necessary context. Such a system can be operated in a fully automatic manner, allowing for incorporation into a completely unsupervised system.

It will be appreciated by those skilled in the art that the present invention can be embodied in other specific forms whithout departing from the spirit or essential characteristics thereof. The presently disclosed embodiments are therefore considered in all respects to be illustrated and not restricted. The scope of the invention is indicated by the appended claims rather than the foregoing description and all changes that come within the meaning and range and equivalence thereof are intended to be embraced therein.

What we claim is:

1. Method for automatically correcting color defective areas in an image, said defective color areas being recorded with a color spectrum deviating from the actual color spectrum of said areas without color defects, comprising the steps of:
    a) identifying basic areas in the image on the basis of features which are common for recorded defective areas, said basic areas supporting an increased likelihood of including defective areas;
    b) reducing a processing to the basic areas to identify at least one of borderlines and centers of the defective areas;
    c) identifying whether the basic areas deemed to be defective are defective; and
    d) creating a correction mask to correct a visual appearance of the defective area if a basic area has been identified to be defective.

2. Method according to claim 1, wherein a specialized portrait mode can be activated in the case of defective red eye detection.

3. Method according to claim 1, wherein if after one of the steps 1a), 1b), and 1c) the processing of an image has not resulted in the identification of an area to be processed further, the processing of an image is stopped and another image can be processed.

4. Method according to claim 1, wherein: after a center of a basic area has been identified, an expected defect is emphasized in its intensity to detect whether the basic area is defective, and in the case of a detected color, the following equation is used:

$$I_{red}=R-\min(G,B),$$

where R refers to a red color channel, G refers to a green color channel, and B refers to a blue color channel.

5. Method of claim 4, wherein a detected color defect includes a defective red eye.

6. Method according to claims 1, wherein the basic areas are treated by an edge detection processing to achieve borderlines of the basic areas.

7. Method according to claim 1, wherein in a case that a red eye defect is to be corrected and a position and a size of an iris have been estimated, a maximum of the red eye defect is determined to be an actual position of the iris of an eye.

8. Method according to claim 7, wherein neighboring pixels are analyzed with respect to at least one of the actual position and center of the iris considering several curves of an HSV color space, which curves are achieved by analyzing a variety of real-world photographs with red eye defects to acquire fuzzy membership functions of three color channels to be taken into account, and determining intersections between at least three color channel positions of each of the neighboring pixels and said fuzzy membership functions, and deciding on the basis of the intersection values that a particular neighboring pixel is defective if its intersection values exceed a predetermined threshold, wherein a correction mask is created, if these steps are repeated for all relevant pixels.

9. Method according to claim 8, wherein a first arrangement around at least one of an equal position or center of the iris forms a first layer of first neighbouring pixels, and if the first layer of first neighboring pixels is at least partially identified as belonging to the red-eye defective pixels, other second neighbouring pixels with respect to the first neighbouring pixels are analyzed along a same line as the first neighbouring, pixels to be identified as red-eye defective pixels, and if further red-eye defective pixels have been identified, considering further other neighbouring pixels, wherein the correction mask is caused to grow.

10. Method according to claim 9, wherein the analysis of and extension to neighboring pixels is terminated if at least one of no further other neighboring pixels have been identified as red-eye defective and if the borderlines of the defective red eye have been at least one of reached and exceeded.

11. Method according to claim 9, wherein pixel data representing the correction mask area directed to at least one smoothing operation.

12. Method according to claim 9, wherein the correction mask is applied to the matching area of an uncorrected image to remove the color defect.

13. Method according to claim 12, wherein the removal of the color defect is practiced by the following equation:

$$I_{red\ new}=R-m(R-\min(G,B)),$$

where m is an element of the correction mask corresponding to a particular pixel of the uncorrected image.

14. Method according to claim 12, wherein, if a particular pixel of the uncorrected image has a considerably large difference between the green channel and the blue channel, the larger channel is adjusted in accordance with the following equation:

$$I_{red\ new}=R-m(R-\min(G,B)),$$

where m is an element of the correction mask corresponding to a particular pixel of the uncorrected image.

15. Method of claim 12, wherein the correction mask is a gray-scale correction mask.

16. Method of claim 12, wherein the color defect is a red-eye defect.

17. Method of claim 8, intersections are determined using the following equation:

$$r=hsv/(\max(h,s,v)).$$

18. Method of claim 1, wherein an identification of basic areas in the image includes the use of at least one of skin detection to identify skin related areas, face detection on the basis of a face pictogram, and eye detection.

19. Method of claim 1, wherein defective areas include red eye defects.

20. An image processing device for processing image data, comprising:

an image data input section;

an image data processing section;

an image data recording section for recording processed image data, wherein the image data processing section implements a method for automatically correcting color defective areas in an image, said defective color areas being recorded with a color spectrum deviating from the actual color spectrum of said areas without color defects, including the steps of:

a) identifying basic areas in the image on the basis of features which are common for recorded defective areas, said basic areas supporting an increased likelihood of including defective areas;

b) reducing the processing to the basic areas to identify at least one of borderlines and centers of the defective areas;

c) identifying whether the basic areas deemed to be defective are defective; and d) creating a correction mask to correct a visual appearance of the defective area if a basic area has been identified to be defective.

* * * * *